United States Patent [19]
Galvin et al.

[11] Patent Number: 6,006,611
[45] Date of Patent: Dec. 28, 1999

[54] DYNAMOMETER COMPRISING COMPUTERISED CONTROL SYSTEM

[75] Inventors: Mark Galvin, Wellington; Paul David Harris, Stokes Valley, both of New Zealand

[73] Assignee: Industrial Research Limited, New Zealand

[21] Appl. No.: 08/793,198

[22] PCT Filed: Aug. 24, 1995

[86] PCT No.: PCT/NZ95/00076

§ 371 Date: Jun. 2, 1997

§ 102(e) Date: Jun. 2, 1997

[87] PCT Pub. No.: WO96/06337

PCT Pub. Date: Feb. 29, 1996

[30] Foreign Application Priority Data

Aug. 24, 1994 [NZ] New Zealand ............................ 264305

[51] Int. Cl.⁶ ..................................................... G01L 3/20
[52] U.S. Cl. ...................................................... 73/862.16
[58] Field of Search ............................. 73/862.13, 862.16, 73/862.18

[56] References Cited

U.S. PATENT DOCUMENTS

| | | | |
|---|---|---|---|
| 3,785,216 | 1/1974 | McLean et al. | 73/862.16 |
| 3,851,524 | 12/1974 | Liu | 73/862.16 |
| 3,942,363 | 3/1976 | Swis et al. | 73/116 |
| 4,161,116 | 7/1979 | Fegraus et al. | 73/861.16 |
| 4,457,182 | 7/1984 | McFarland | 73/862.18 |
| 4,807,467 | 2/1989 | Kugler | 73/862.16 |
| 5,195,038 | 3/1993 | Yagi et al. | 73/862.18 |
| 5,465,612 | 11/1995 | La Belle | 73/862.16 |
| 5,623,104 | 4/1997 | Suga | 73/861.18 |

FOREIGN PATENT DOCUMENTS

| | | |
|---|---|---|
| 22310/88 | 3/1989 | Australia . |
| 27452/92 | 5/1993 | Australia . |
| 258467 | 7/1988 | German Dem. Rep. . |
| 2816734 | 10/1978 | Germany . |
| 2912283 | 7/1980 | Germany . |
| 3733513 | 4/1989 | Germany . |
| 2213946 | 8/1989 | United Kingdom . |

Primary Examiner—Benjamin R. Fuller
Assistant Examiner—Jewel V. Thompson
Attorney, Agent, or Firm—Ostrager Chong Flaherty & Onofrio

[57] ABSTRACT

A dynamometer comprises means to mechanically couple a hydraulic pump to the engine output, means indicating the rotational speed of the engine output, means indicating the torque and/or power of the engine output, valve means for controlling the load absorbed by the hydraulic pump, computerised control means receiving the signals indicative of engine speed and output torque and/or power and capable of controlling the valve means to vary the load applied to the engine to operate the engine under programmed varying speeds and/or loads, and output means to display and/or print data indicating engine power and/or torque at one or a range of engine speeds. Preferably the dynamometer operates in either a set speed mode in which the engine is maintained at a constant seed under varying loads or a set load mode in which the engine is maintained under a constant load with varying speeds. The dynamometer may also be operated in an autoplot mode in which the engine speed is increased over time with the computer logging information indicating the engine power and/or torque output at set engine speeds spaced over the engie operating range.

4 Claims, 11 Drawing Sheets

Client Information

Reg_No ON2247    Date 08-10-94

Control Type: Manual Car / Automatic Car

Auto Save: On / Off

Auto Print: On / Off

Wheel Unit: 2 / 4

Exit

Fig. 10

Setup Information

Vehicle Information                    Environment

Wheel Dia.(mm) `600`    Barometric Press.(mbar) `1013`

Drive Ratio `3.800`    Air Temperature(°C) `20`

Cylinder `4`  Stroke `4`  Humidity (%) `80`

Vehicle Type `LIGHT`

---

Auto Power Information

Minimum RPM (rpm x100) `15`    Settling Time (Sec) `3`

Maximum RPM (rpm x100) `30`    Number of Test `6`

Number of Readings `10`

Press SETUP to exit...

Fig. 11

DYNAMOMETER COMPRISING COMPUTERISED CONTROL SYSTEM

FIELD OF INVENTION

The invention comprises a dynamometer for testing or analysing the torque and power output of an engine, such as the engine of a motor vehicle.

SUMMARY OF INVENTION

In broad terms the invention comprises a dynamometer comprising:

- means to mechanically couple a hydraulic pump to the engine output,
- means indicating the rotational speed of the engine output,
- means indicating the torque and/or power of the engine output,
- valve means for controlling the load absorbed by the hydraulic pump,
- computerised control means receiving the signals indicative of engine speed and output torque and/or power and capable of controlling the valve means to vary the load applied to the engine to operate the engine under programmed varying speeds and/or loads, and
- output means to plot and/or print data indicating engine power and/or torque at one or a range of engine speeds.

In a dynamometer of the invention which is intended for use with conventional motor vehicles such as motor cars, a hydraulic pump is coupled to the driven wheels on either side of the motor vehicle. Preferably each hydraulic pump has an associated hub coupling adapted to be coupled to the wheel hub after removal of the road wheel, using the wheel studs of the hub. The hydraulic pumps, one for each of the two driven wheels of the motor vehicle, may each form part of a wheel unit which is positioned one on either side of the vehicle adjacent the driven wheels of the vehicle. Each such wheel unit may be self contained comprising its own hydraulic reservoir and heat exchanger for removing heat from the hydrnc fluid, or alternatively pipes may connect the hydraulic pump of each wheel unit to a separate common reservoir for both of the wheel units for example.

Preferably the computerised control means comprises a computer having an associated VDU and input keyboard of some type and optionally a printer, and a separate servo control unit which directly controls the wheel units to maintain the engine at a constant speed when the dynamometer is in a set speed mode and to maintain the load on the engine conant when the dynamometer is in a set load mode. The computer passes the programmed set speed or set load information to the servo control unit and the servo control unit passes information indicating output speed and output power to the computer for analysis and display or printing.

In a preferred form, the dynamometer also comprises an auoplot mode in which the computer controls the servo control unit lo cause the servo control unit to allow the engine speed to increase over time with the computer logging information indicating the engine power and/or torque output at set engine speeds spaced over the engine operating range or a part thereof The computer may display this data graphically on the VDU or print it graphically or in tabular form. The test regime to be applied by the dynamometer when in autoplot mode may be programmed into the computer by an operator.

In a preferred form the mode of the dynamometer and the set load and set speed points may also be entered into the dynamometer via a separate handset control which operator may carry while moving around the vehicle for example.

DESCRIPTION OF DRAWINGS

A preferred form dynamometer will now be described referring to the accompanying drawings, by way of example.

In the drawings:

FIGS. 10 and 11 show the VDU entry screens of the dynamometer when information regarding the vehicle such as the vehicle registration number, model etc is entered at the commencement of a test.

DETAILED DESCRIPTION OF PREFERRED FORM

Figure 1:
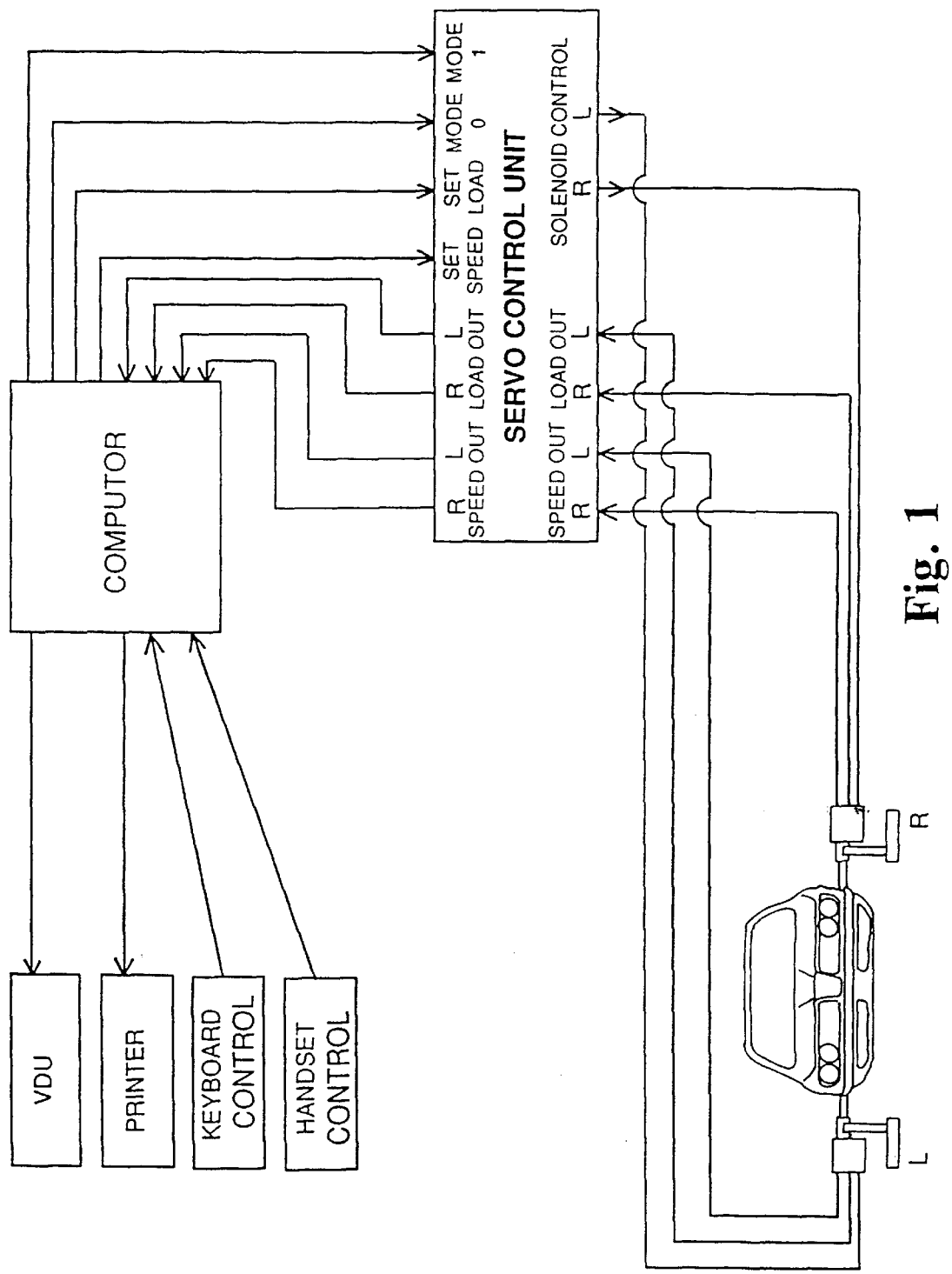
FIG. 1 shows the major components of the preferred form dynamometer of the invention.

FIG. 1 shows the major components of the preferred form dynamometer. The dynamometer comprises the computer, with associated VDU and keyboard, and optionally a printer for printing test reports in hard copy and a handset control by which an operator may control the operation of the dynamometer while waling around a vehicle for example. The computer VDU, keyboard servo control unit etc may be incorporated into a single physical unit which is connected by cables to each of the wheel units each comprising a hydraulic pump as will be further described.

The computer with VDU implements the user interface (see FIG. 1), and displays the test vehicle's performance.

The mode of operation of the dynamometer, and the set speed point for set speed mode and set load point for set load mode, are controlled/entered through either the keyboard or the remote handset. The computer may be programed with automatic test sequences. The computer takes measurements of torquetpower output and engine speed at predetermined points and generally controls operation of the dynamometer in autoplot mode.

WHEEL UNITS

Figure 2:
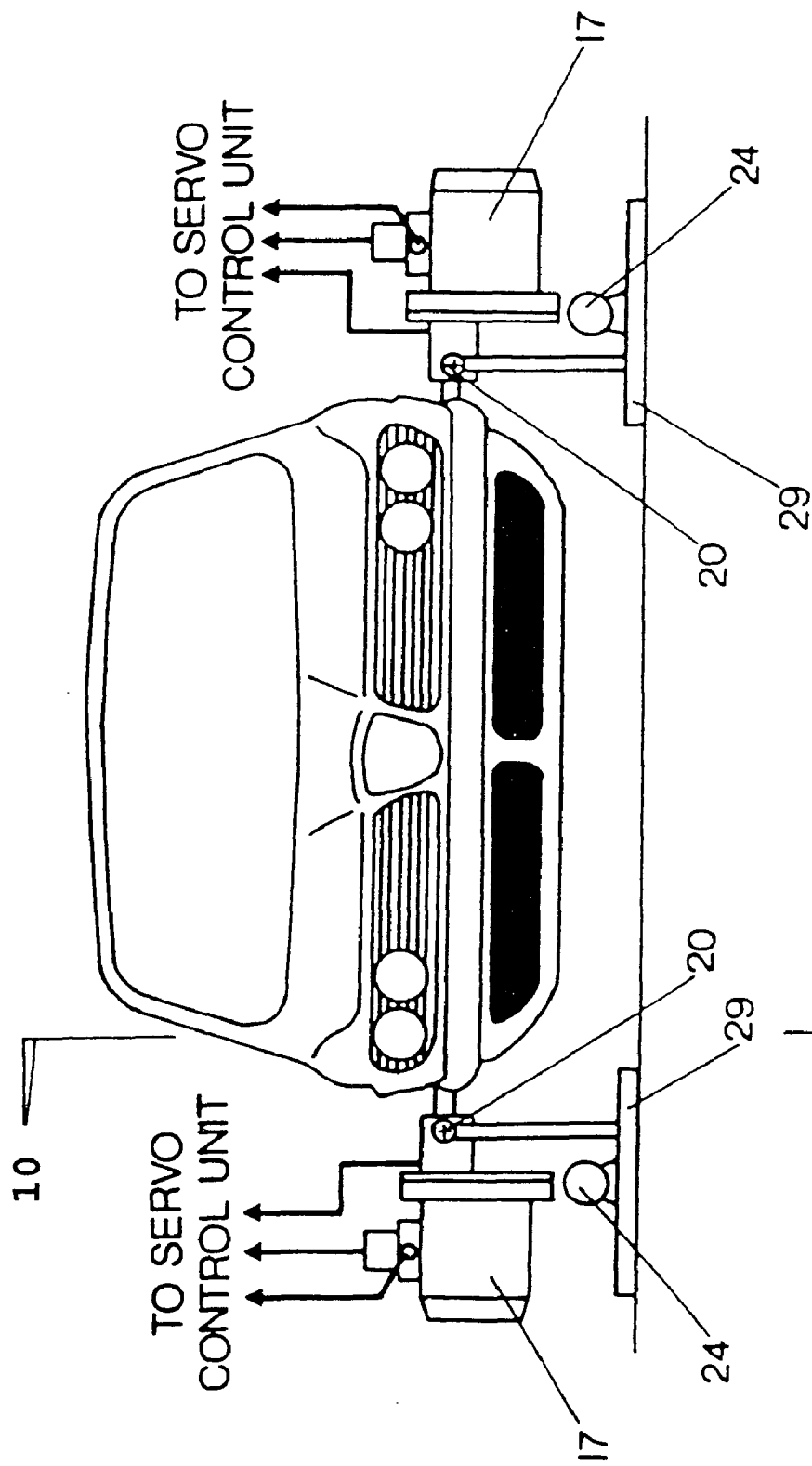
FIG. 2 shows the wheel units of the preferred form dynamometer applied to the hubs of the two driving wheels of a car.
Figure 3:
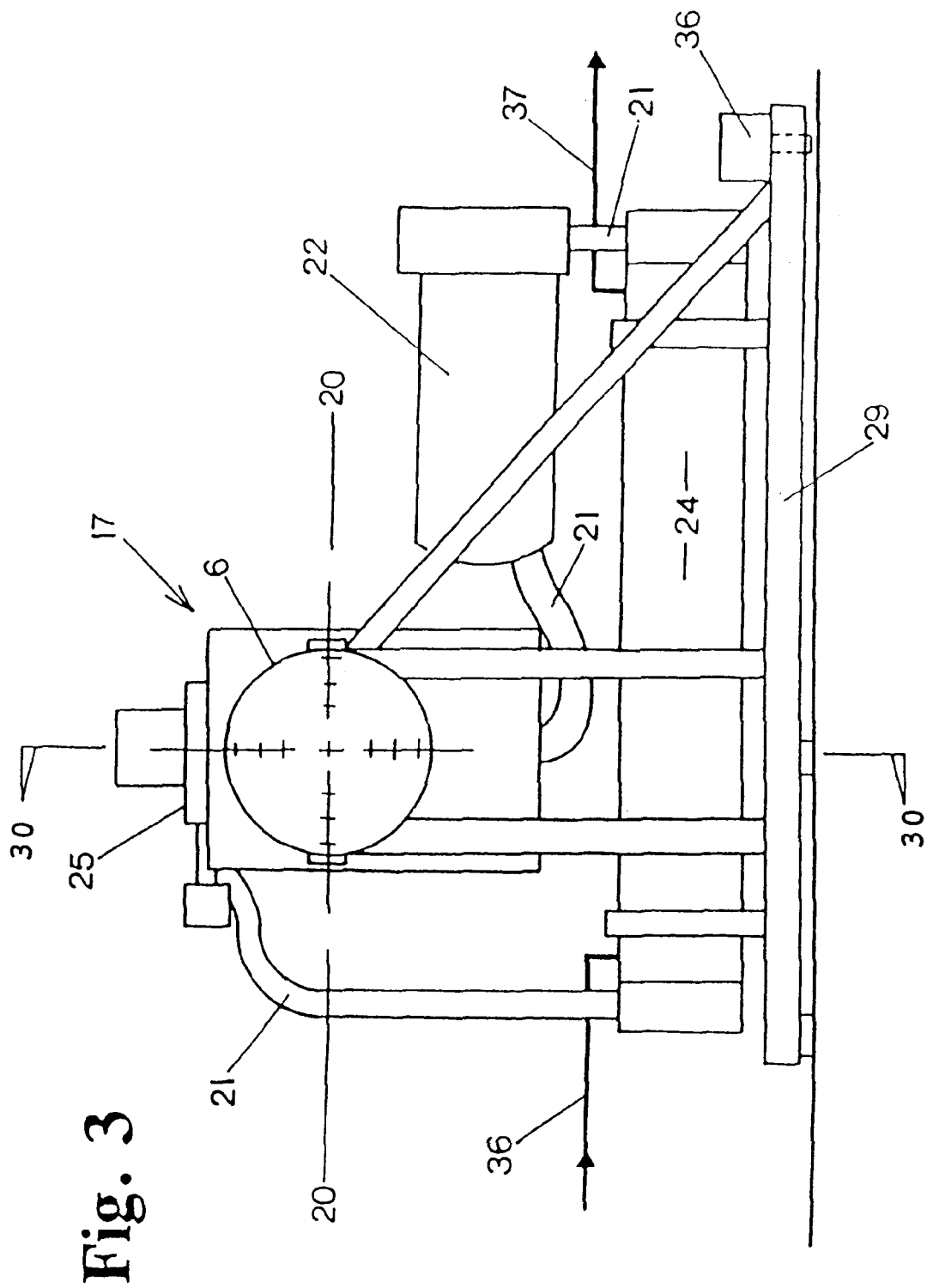
FIG. 3 shows one of the wheel units of FIG. 2 in the direction of arrow A of FIG. 2.
Figure 4:
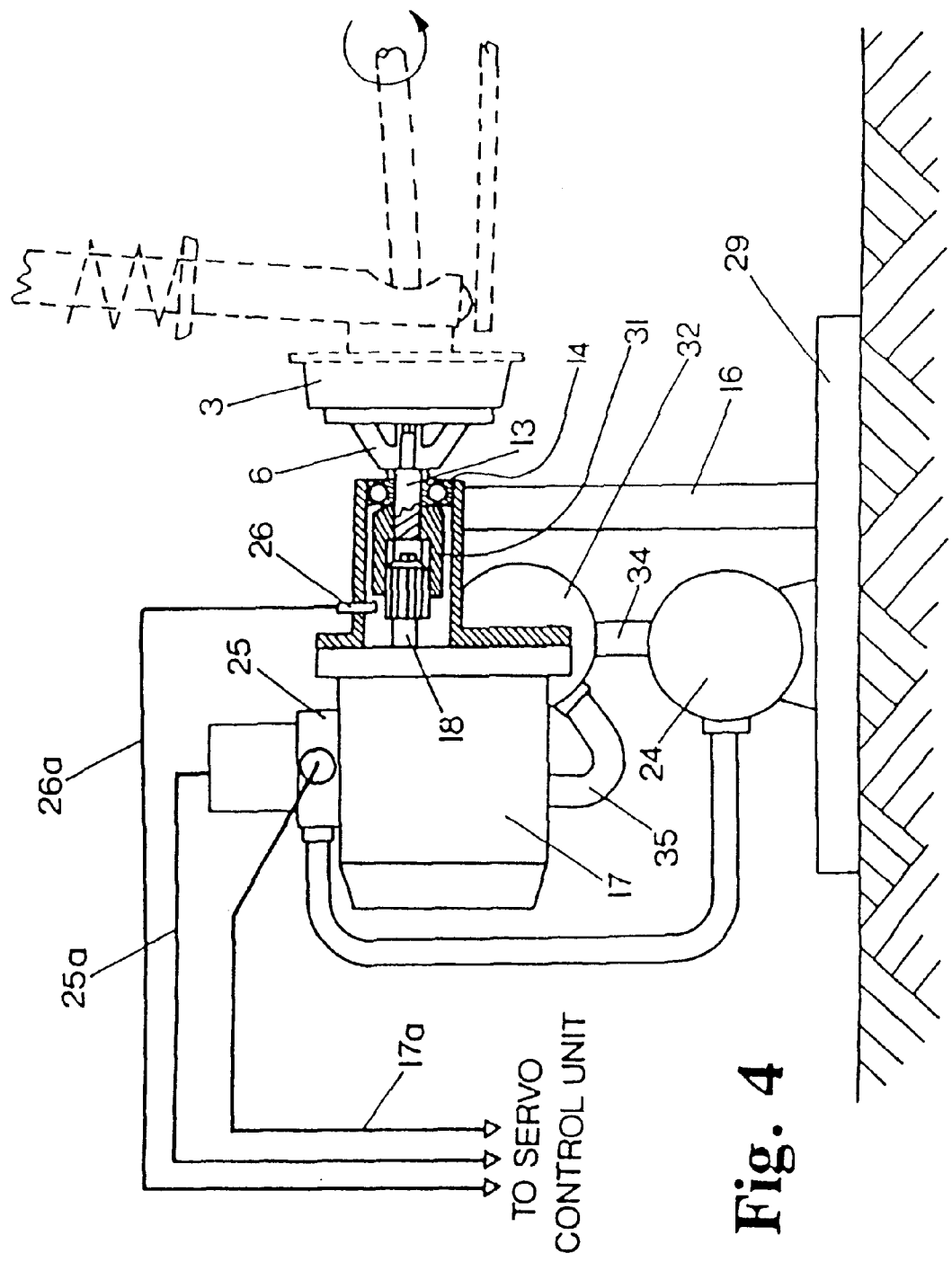
FIG. 4 is a partly sectional view of one of the wheel units, along line B—B of FIG. 3.

FIG. 3 shows one of the wheel units and FIGS. 2 and 3 show two wheel units coupled to the hubs 3 of the driven wheels of a vehicle under test The vehicle drive wheels are first removed on jacking up the vehicle and the two left and right dynamometer wheel units are positioned one at each side of the vehicle, and bolted to the vehicle hubs 3 on each side using the wheel studs 4 (see FIG. 4). The dynamometer wheel unit on each side comprises a hub coupling 6 comprising holes for bolting to wheel studs in various patterns.

In each wheel unit the hub coupling 6 is connected through a shaft 13 to the input shaft 18 of a hydraulic pump 17. In the preferred form shown in the drawings the shaft 13 from the hub coupling 6 is connected to the pump input shaft 18 through a splined connection 31 as shown in FIG. 4. In each wheel unit the shaft 13 is rotatably carried in a roller bearing 14 in an upper housing 15 shown in cross-section in FIG. 4 and to which the pump 17 is fixed The upper housing 15 is pivotally mounted between two uprights 16 from a base 29. The base 29 stably supports the assembly comprising the housing 15/pump 17/hub coupling 6 fixed to the vehicle hub. The assembly is pivotally mounted about axis 20 (shown in FIG. 3), to accommodate wheel camber of the vehicle for example.

In the preferred form dynamometer shown in the drawings each of the left and right wheel units has its own hydraulic circuit and reservoir 22 and heat exchanger 24 all mounted on the base 29. The reservoir 22 has feed and return conduits 21 to the pump 17. Cooling pipes pass through the heat exchanger 24. Cooling water is passed through inlet pipe 36 through coils in the heat exchanger over which the hot hydraulic fluid passes, and out the outlet pipe 37. In use the inlet pipe 36 is connected to a nearby ordinary pressure water tap and the outlet pipe 37 directs the water exiting the heat exchanger to a drain. In the drawings the reservoir 22 and heat exchanger 34 are separately shown, but a combination reservoir and heat exchanger may be used.

The hydraulic pumps 17 of the wheel units each comprise an associated solenoid operated pressure control valve 25 on the outlet side of the pump 17. The valve 25 increases or decreases the load applied to the vehicle under test by increasing or decreasing the effective size of the pump outlet orifice. The solenoid valve 25 is controlled by the servo control unit over line 25a in FIG. 4.

The torque applied by a vehicle under test is measured by measuring the pump output pressure in the hydraulic circuit before the control valve 25, or alternatively by measuring the torque reaction of the pump assembly 17 with a strain gauge or similar. The pump output pressure signal is passed to the servo control unit over line 17a in FIG. 4.

The hub rotation speed is measured by a speed transducer 26 which transmits a speed signal to the servo control unit over line 26a in FIG. 4.

In the set speed mode of operation of the dynamometer the solenoid valve 25 of each wheel unit is controlled by the servo control unit to maintain the rotational speed of the wheel hubs constant and thus the engine rpm constant, by varying the outlet orifice size for each of the pumps 17 and thus the load applied by the pumps to the engine. If the engines speed tends to increase, the servo control unit closes the outlet valve 25 slightly to increase the applied load and maintain the engine speed constant In the set load mode, the solenoid valve 25 of each wheel unit is controlled by the servo control unit to apply a set load to the engine. The rotational speed of the wheel hubs and thus the engine rpm may vary.

SERVO CONTROL UNIT

The servo control unit is a digitaVanalogue unit which directly controls the solenoid valve 25 of each pump 17 to maintain the engine speed of the vehicle under test at the programmed set speed point when the dynamometer is in set speed mode, and controls the solenoid valves 25 to maintain a constant load when the dynamometer is in set load mode. In the preferred form servo control unit shown in the drawings both the programmed speed and load mode set points are supplied by the computer as frequency signals. The measured actual speed signal from the transducer 26 at each wheel over line 26a and load signal from the pump output over line 25a are also fed back to the PC as frequency signals.

Figure 5:
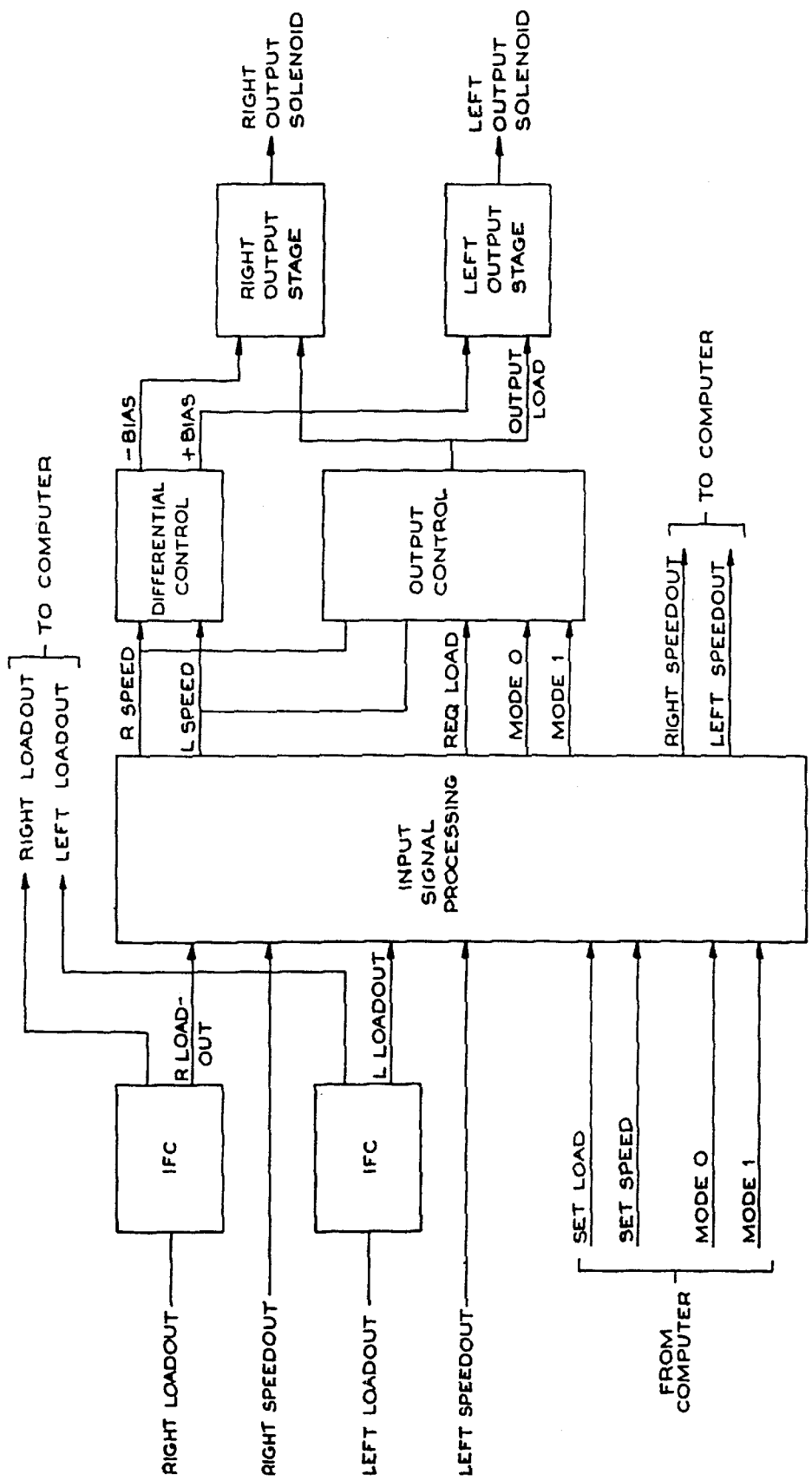
FIG. 5 is a block diagram of the servo control unit of the preferred form dynamometer shown in FIG. 1.

The signal connections between the servo control unit and each wheel unt as shown in FIG. 5 are:

RIGHT LOAD OUT & LEFT LOAD OUT signals output over lines 17a one from each of the left and right wheel units to the servo control unit which indicate the torque applied by the engine of the test vehicle at each wheel unit;

RIGHT SPEED OUT & LEFT SPEED OUT are signals output over lines 26a one from the speed nsducer 26 in each wheel unit to the servo control unit which indicate the rotational speed at each wheel;

RIGHT OUTPUT SOLENOID & LEFT OUTPUT SOLENOID cary the control signals from the servo control unit over lines 25c to the solenoid controlled pump outlet valve 25 of each wheel unit.

The computer and servo control unit communicate as follows:

RIGHT SPEED OUT & LEFT SPEED OUT: The rotational speed of each wheel is passed separately to the computer from the servo control unit over these lines, in the preferred form as a digital pulse train. As the instantaneous frequency of the wheel speed signal may differ significantly from that of the average wheel speed, wheel speed is desirably measured as the average frequency of n pulses, where n should preferably relate to a whole number of wheel revolutions. The speed of each hub is supplied to the computer independently.

RIGHT LOAD OUT & LEFT LOAD OUT: Signals indicating the torque exerted by the engine at each wheel unit are passed separately by the servo control unit to the PC over these lines, in the preferred form as a varying frequency where no load is represented by a lower frequency and fulil load by a higher frequency. The load signal frequency is desirably measured as the average frequency of a number of consecutive cycles.

SET SPEED: The programmed speed set point is supplied by the computer to the servo control unit over line SET SPEED, in the preferred form as a varying frequency.

SET LOAD: The programmed load set point signal is supplied by the computer to the servo control unit over line SET LOAD, in the preferred form as a varying frequency. For example a lower frequency signal may represent no load and a higher frequency signal fill load OPERATING MODE CONTROL SIGNALS: The operating mode of the servo control unit is controlled over lines MODE 0 and MODE 1 by two binary coded control signals from the computer. The operating modes in the preferred form dynamometer are Set Speed Mode, Set Load Mode, Auto Plot Mode, and Relative Power Mode.

CONTROL SYSTEM OPERATION

Figure 9:
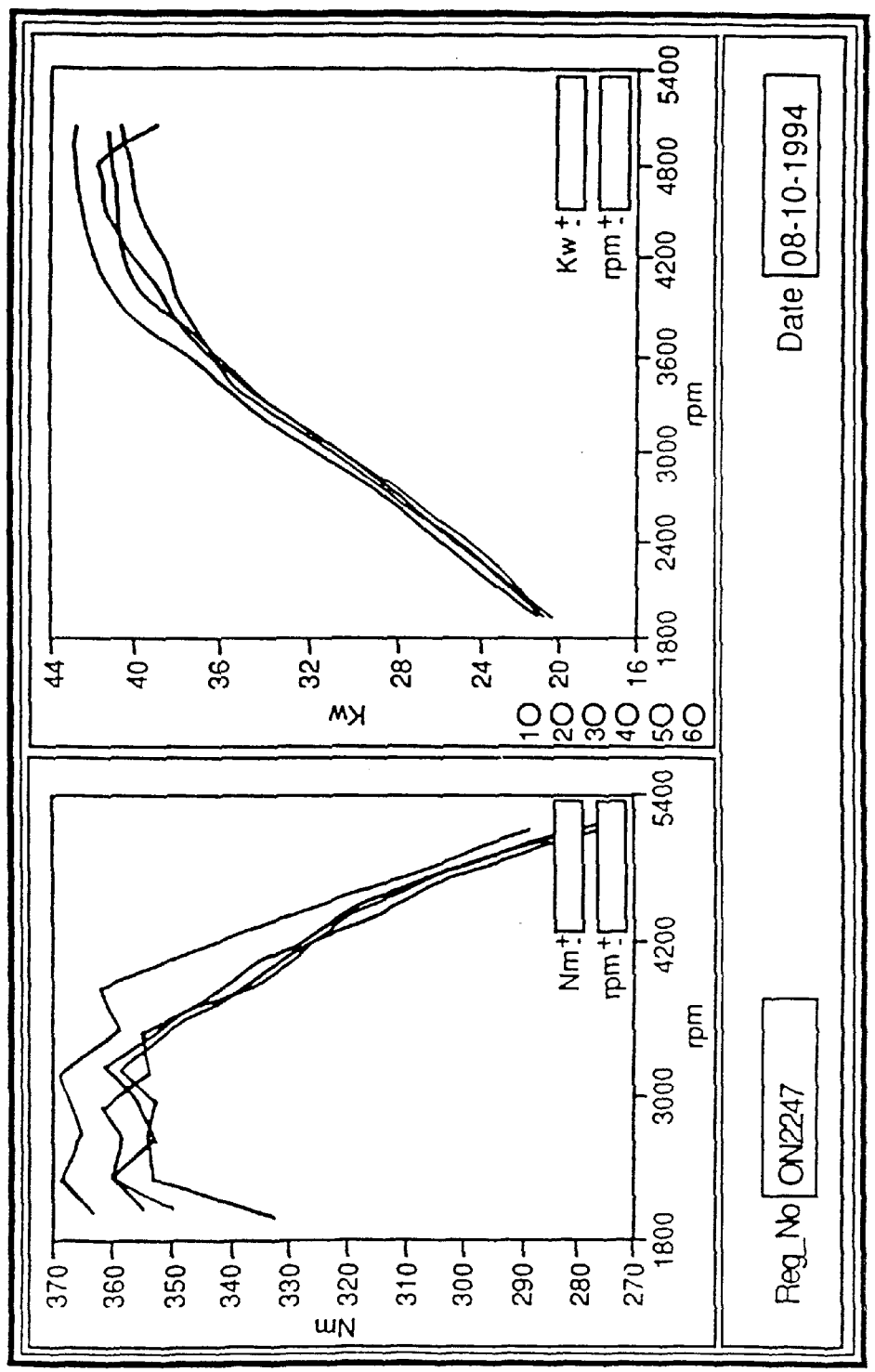
FIG. 9 shows the VDU screen of the dynamometer when in autoplot mode.

FIGS. 9 and 10 are block diagrams of the control structure of the servo control unit for set speed and set load modes respectively.

Figure 6:
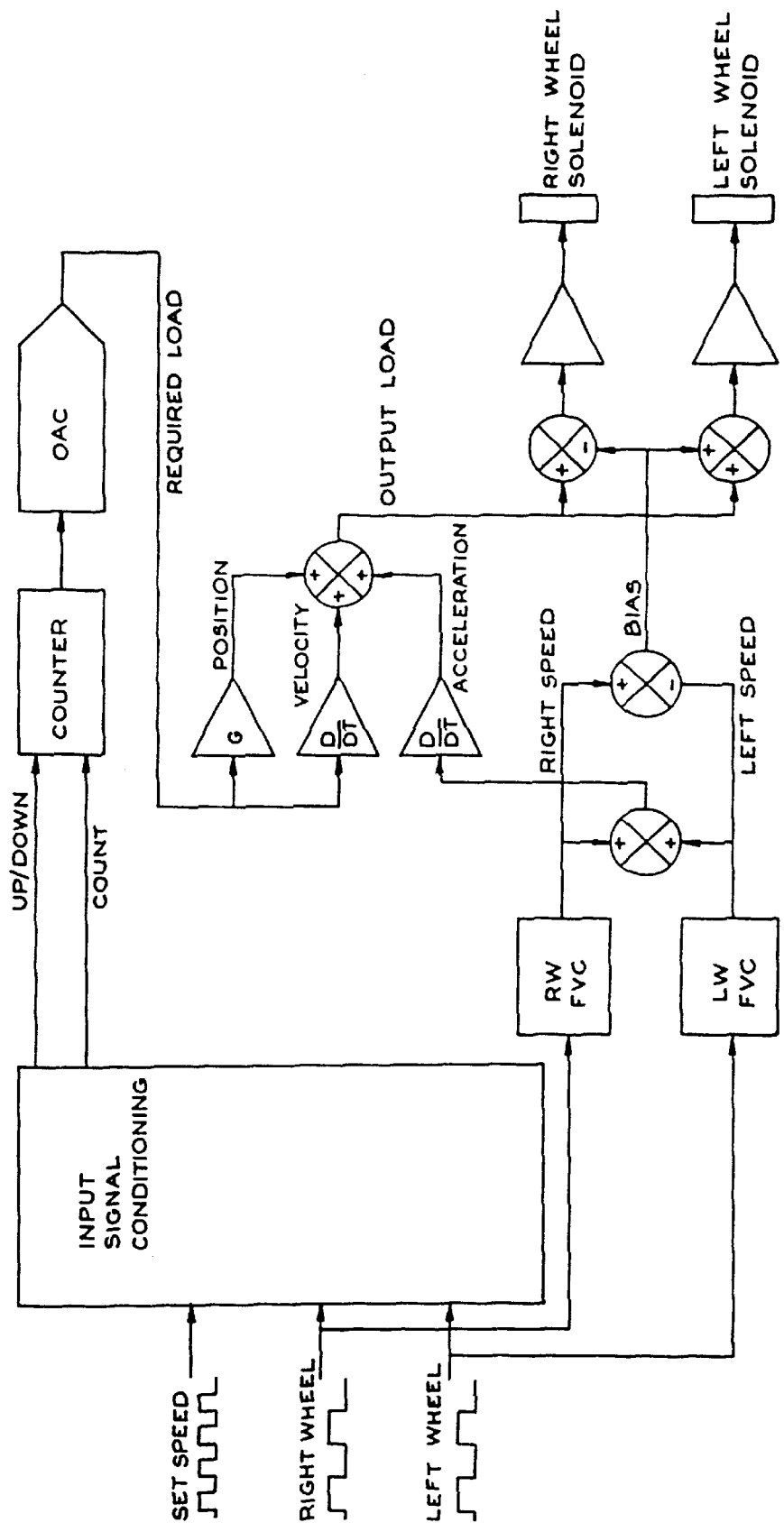
FIG. 6 is a block diagram of the control structure of the servo control unit of FIG. 5 when the dynamometer is in set speed mode as will be described.
Figure 7:
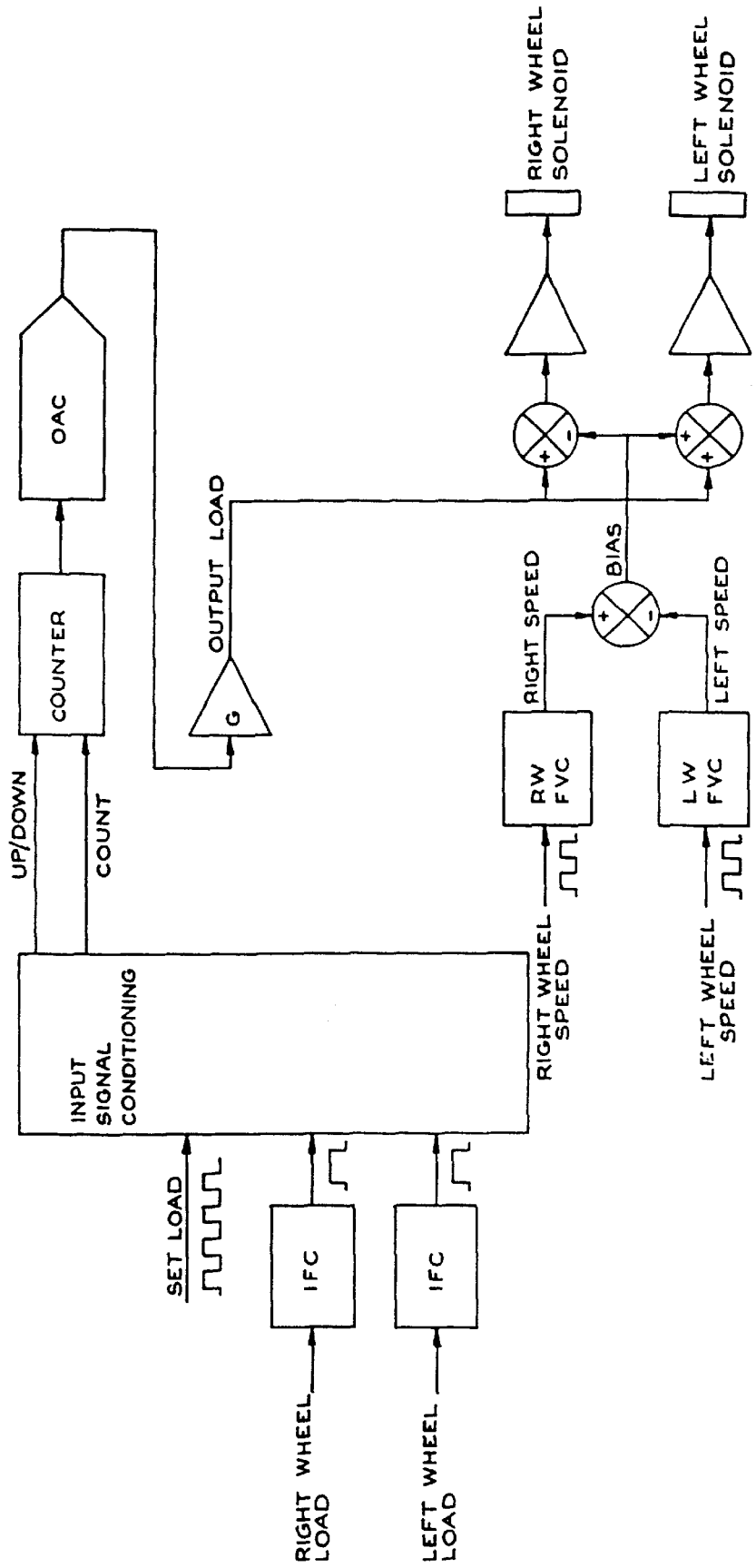
FIG. 7 is a block diagram of the control structure of the servo control unit of FIG. 5 when the dynamometer is in set load mode.

Wheel Synchronisation: Wheel speed synchronisation is controlled in the servo control unit and is achieved identically in both modes by converting the frequency signal indicating the speed of each wheel to a voltage and determining the difference. The resting difference signal named BIAS is then applied in antiphase to the two output stages as shown in FIGS. 6 and 7, thereby causing the total load applied to the vehicle to be applied unequally to the two wheels.

Set Speed Mode: In set speed mode as shown in FIG. 6 the servo control unit has three main input signals indicating the rotational speed of each of the wheel hubs from each wheel unit and the programmed speed setpoint from the computer. These asynchronous pulse trains are converted by the input signal conditioning block to non overlapping pulse tains required to control the up/down counter. Each selpoint pulse initiates a down count, while wheel speed feedback pulses initiate up counts. The counter contains the integral velocity error between setpoint and vehicle speeds, which is converted to an analogue voltage by the digital to analogue converter (DAC). The output load required to maintain setpoint speed is found by summing the DAC output, the time derivative of the DAC output, and the time derivative of the sum of wheel speeds. These three components are respectively position error, velocity error, and acceleration feedback terms. The resulting required load signal is applied equally to the two analogue output stages.

Set Load Mode: In set load mode as shown in FIG. 7 operation is very similar to that in set speed mode. For load control the selpoint signal causes the counter to count up, while feedback causes down counting. The final difference is that the output signal is proportional to the DAC output alone.

Autoplot Mode: In autoplot mode, the computer controls the dynamometer through the servo control it. An operator depresses the accelerator of the car fully. Through the servo control unit under control of the computer programmed with test procedures, the solenoid valve 25 of each wheel unit is controlled to allow the engine speed to increase over a predetermined range, typically from idle to maximum RPM over one or preferably multiple repeat runs. Engine output power is measured so that for each rum the dynamometer may plot on the VDU torque and power against engine speed at set engine speed spacings as shown in FIG. 9, or may store or print such data.

USER OPERATION

On commencing the test of a vehicle, the vehicle is jacked up, the road wheels of the vehicle are removed, and the wheel units are fitted in place. The jacking means is then removed so that the weight of the vehicle is carried by the wheel units to stabilise the wheel unit Initial vehicle and test regime information is inputted in the to dynamometer. FIGS. 9 and 10 show the setup screens of the dynamometer input software. On commencing the test of a vehicle, details may be entered such as the registration number (or chassis number) of the car, the test date, the job number or client number, whether the car has a manual or automatic transmission. The wheel diameter and final drive ratio of the vehicle are entered, which are required in order to convert the hub speed to the actual car road speed and the power or torque as a function of engine speed. Vehicle and engine type may be entered as may other data such as the barometric air pressure, air temperature and humidity at the time of test. These may be required to relate the measurements taken under the particular atmospheric conditions back to an international standard under set atmospheric conditions. The minimum and maximum engine rpm speeds at which plots are to begin and end in autoplot mode are also entered as are the number of runs to be plotted in autoplot mode.

The dynamometer may be put initially into autoplot mode as described above. The minimum or staring engine rpm and maximum engine rpm have previously been entered. The operator depresses the accelerator of the vehicle fully. Engine output power is measured and the control system plots on the VDU torque and power against engine speed, as shown in FIG. 9.

Figure 8:
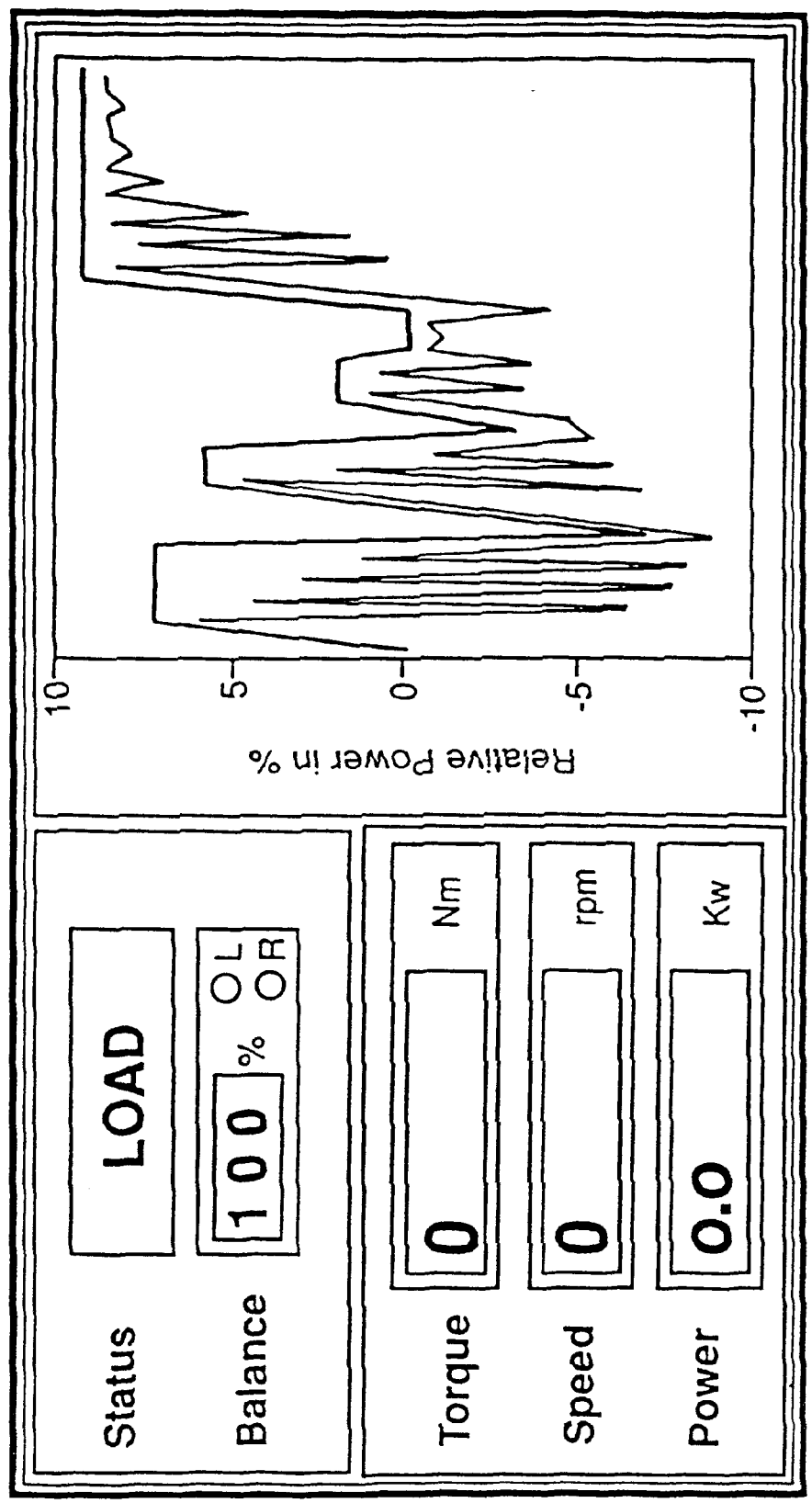
FIG. 8 shows the VDU screen of the dynamometer when in set load mode.

While adjustments are being made on the engine the dynamometer may be put into set speed or set load mode. FIG. 8 shows the VDU screen when the dynamometer is in set load mode, which incorporates a relative power screen. On the left of FIG. 9 the mode is shown as LOAD. The engine torque, speed and power are numerically displayed. On the right the relative power screen visually displays the effect of engine adjustment. For example, a user may adjust the engine timing slightly which may increase power by 2 or 3%. This increase in power is visually displayed as a percentage on the relative power screen compared to the starting point or previous points on the screen. For example, the screen may display relative powers for the previous 60 seconds. On the relative power screen as shown in FIG. 8 both instantaneous and peak capture curves are plotted.

Emergency Shutdown: In the event of a major fault occurring in either a wheel unit or the PC, an emergency shut-down system removes engine loading and, provided that appropriate connections have been made from the vehicle electrical system to the dynamometer, kills the engines ignition. This can also be activated using emergency stop switches mounted on the controller cabinet and remote handset.

The foregoing describes the invention including a preferred from thereof. Alterations and modifications as will be obvious to those skilled in the art are intended to be incorporated within the scope hereof.

We claim:

1. A dynamometer for measuring the output torque and/or power of the engine of a vehicle, comprising:

at least two portable wheel units each comprising a hydraulic pump and a hub coupling connected to said hydraulic pump and enabling coupling of said wheel unit to a hub of a driven wheel of a vehicle, so that said wheel unit can be coupled to said driven wheels one on each side of a vehicle under test so that said hydraulic pumps of said wheel units are driven on operation of the vehicle engine;

valve means for controlling the load absorbed by said hydraulic pumps; and computerised control means including an electronic servo control unit arranged to directly control said valve means in any of a set speed mode in which the computerised control means maintains the engine at a constant speed under varying loads, a set load mode in which the computerised control means maintains the engine under a constant load with varying speeds, or an autoplot made in which the engine speed is increased or decreased over time with the computer logging information indicating the engine power and/or torrue output at set engine speeds spaced over the engine operating range or a part thereof, said computerised control means being arranged to pass control information to said servo control unit and said servo control unit being arranged to pass information indicative of output torque and/or power to said control means during operation of the dynamometer, for analysis and display or printing; and means arranged to display to a user or print said information in graphical form.

2. The dynamometer according to claim 1, wherein the test regime to be applied by the dynamometer when in autoplot mode may be programmed into the dynamometer by an operator.

3. A dynamometer according to claim 1, wherein the mode of the dynamometer and the set load and set speed points may also be entered into the dynamometer via a separate handset control.

4. A dynamometer according to claim 2, wherein the mode of the dynamometer and the set load and set speed points may also be entered into the dynamometer via a separate handset control.

* * * * *

UNITED STATES PATENT AND TRADEMARK OFFICE
CERTIFICATE OF CORRECTION

PATENT NO. : 6,006,611
DATED : December 28, 1999
INVENTOR(S) : Mark Galvin and Paul David Harris It is certified that error appears in the above-identified patent and that said Letters Patent is hereby corrected as shown below:

At Col. 1 line 41 delete "hydrnc" and insert -- hydraulic --.

At Col. 1 line 50 delete "conant" and insert -- constant --.

At Col. 1 line 56 delete "auoplot" and insert -- autoplot --.

At Col. 1 line 57 delete "lo" and insert -- to --

At Col. 2 line 15 delete "A" and insert -- 10 --.

At Col. 2 line 17 delete "B-B" and insert -- 30-30 --

At Col. 2 line 44 delete "waling" and insert -- walking --.

At Col. 2 line 57 delete "torquetpower" and insert -- torque/power --.

At Col. 3 line 63 delete "digitaVanalogue" and insert -- digital/analogue --.

UNITED STATES PATENT AND TRADEMARK OFFICE
CERTIFICATE OF CORRECTION

PATENT NO. : 6,006,611
DATED : December 28, 1999
INVENTOR(S) : Mark Galvin and Paul David Harris page 2 of 3

It is certified that error appears in the above-identified patent and that said Letters Patent is hereby corrected as shown below:

At Col. 4 line 17 delete "nsducer" and insert -- transducer --.

At Col. 4 line 41 delete "fulil" and insert -- full --.

At Col. 5 line 11 delete "tains" and insert -- trains --.

At Col. 5 line 11 delete "selpoint" and insert -- setpoint --.

At Col. 5 line 37 delete "rum" and insert -- run --.

At Col. 5 line 47 after "unit" insert a -- . --.

At Col. 5 line 67 delete "staring" and insert -- starting --.

UNITED STATES PATENT AND TRADEMARK OFFICE
CERTIFICATE OF CORRECTION

PATENT NO. : 6,006,611
DATED : December 28, 1999
INVENTOR(S) : Mark Galvin and Paul David Harris It is certified that error appears in the above-identified patent and that said Letters Patent is hereby corrected as shown below:

In Claim 1 line 55 delete "torrue" and insert -- torque --.

In the Abstract line 15 delete "seed" and insert -- speed --.

In the Abstract line 20 delete "engie" and insert -- engine --.

Signed and Sealed this

Sixteenth Day of January, 2001

Attest:

Q. TODD DICKINSON

Attesting Officer     *Commissioner of Patents and Trademarks*